United States Patent
Sakai et al.

(10) Patent No.: US 11,978,933 B2
(45) Date of Patent: May 7, 2024

(54) COMPRESSION APPARATUS

(71) Applicant: Panasonic Intellectual Property Management Co., Ltd., Osaka (JP)

(72) Inventors: Osamu Sakai, Osaka (JP); Takashi Kakuwa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 490 days.

(21) Appl. No.: 17/412,331

(22) Filed: Aug. 26, 2021

(65) Prior Publication Data
US 2021/0384539 A1    Dec. 9, 2021

Related U.S. Application Data

(63) Continuation of application No. PCT/JP2020/044133, filed on Nov. 27, 2020.

(30) Foreign Application Priority Data

Jan. 8, 2020  (JP) .................................. 2020-001664

(51) Int. Cl.
*H01M 8/0656* (2016.01)
*C25B 9/05* (2021.01)

(52) U.S. Cl.
CPC ............. *H01M 8/0656* (2013.01); *C25B 9/05* (2021.01)

(58) Field of Classification Search
CPC .......... H01M 8/0656; C25B 9/05; C25B 1/02; C25B 1/04; C25B 9/23; C25B 9/60; C25B 9/75; C25B 9/77; C25B 15/081; C25B 9/19; C25B 15/00; Y02E 60/36; Y02E 60/50; C01B 3/00
See application file for complete search history.

(56) References Cited

U.S. PATENT DOCUMENTS

2016/0130708 A1    5/2016  Daimon et al.

FOREIGN PATENT DOCUMENTS

| JP | 2015-117139 | 6/2015 | |
| JP | 2016-089229 | 5/2016 | |
| WO | WO-2009144871 A1 * | 12/2009 | .......... H01M 8/0247 |

OTHER PUBLICATIONS

International Search Report of PCT application No. PCT/JP2020/044133 dated Jan. 26, 2021.

* cited by examiner

*Primary Examiner* — Jacob M Amick
*Assistant Examiner* — Charles J Brauch
(74) *Attorney, Agent, or Firm* — Rimon P.C.

(57) ABSTRACT

A compression apparatus includes an electrolyte membrane, an anode on a principal surface of the electrolyte membrane, a cathode on another principal surface of the electrolyte membrane, an anode separator on the anode, a cathode separator on the cathode, and a voltage applicator. Upon the voltage applicator applying a voltage, protons are extracted from an anode fluid fed to the anode to move to the cathode through the electrolyte membrane and compressed hydrogen is produced. The anode separator has a fluid channel, a manifold hole, and a communicating path which are formed in an anode-side principal surface. The compression apparatus includes a face seal disposed on an outer periphery of a region of the anode-side principal surface of the anode separator which faces the anode. The face seal has a three-layer structure including a metal sheet and a pair of elastic sheets.

10 Claims, 3 Drawing Sheets

COMPRESSION APPARATUS

BACKGROUND

1. Technical Field

The present disclosure relates to a compression apparatus.

2. Description of the Related Art

Because of environmental issues, such as global warming, and energy problems, such as exhaustion of petroleum resources, great attention has been focused on hydrogen as a clean alternative energy resource to fossil fuel. High expectations have been placed on hydrogen as clean energy, since hydrogen basically produces only water, does not produce carbon dioxide, which contributes to global warming, and substantially does not produce nitrogen oxides when combusted. Examples of apparatuses that use hydrogen as a fuel at high efficiencies include fuel cells, which have been developed and become popular for use in automobile power sources and household self-power generation.

For example, hydrogen used as a fuel for fuel cell vehicles is commonly stored in a hydrogen tank included in the vehicle at high pressures, that is, while compressed to several tens of megapascal. The high-pressure hydrogen is commonly produced by compressing low-pressure (normal pressure) hydrogen with a mechanical compression apparatus.

In the coming hydrogen society, there is a demand for the development of the technology for storing the hydrogen at high densities in order to transport or use the hydrogen at small volume and low costs, as well as the technology for producing hydrogen. In particular, it is necessary to upgrade hydrogen feed infrastructures for accelerating the popularization of fuel cells. There have been proposed various methods in which high-purity hydrogen is produced, purified, and stored at high densities in order to feed hydrogen consistently.

For example, Japanese Unexamined Patent Application Publication No. 2015-117139 proposes an electrochemical hydrogen pump that purifies and pressurizes hydrogen included in a hydrogen-containing gas by applying a predetermined voltage between an anode and a cathode that are provided with an electrolyte membrane interposed therebetween. Hereinafter, a multilayer body constituted by a cathode, an electrolyte membrane, and an anode is referred to as "membrane electrode assembly (MEA)". The hydrogen-containing gas fed to the anode may contain impurities. For example, the hydrogen-containing gas may be a hydrogen gas discharged from an iron-making factory or the like as a by-product or a reformed gas produced by reforming town gas.

For example, Japanese Patent No. 6129809 proposes a differential pressure water electrolyzer that produces low-pressure hydrogen by electrolysis of water and pressurizes the low-pressure hydrogen using MEAs.

SUMMARY

One non-limiting and exemplary embodiment provides a compression apparatus that may reduce the costs of the apparatus while improving the capability of a face seal to seal an anode fluid, compared with the compression apparatuses known in the related art.

In one general aspect, the techniques disclosed here feature a compression apparatus including an electrolyte membrane, an anode disposed on a principal surface of the electrolyte membrane, a cathode disposed on another principal surface of the electrolyte membrane, an anode separator disposed on the anode, a cathode separator disposed on the cathode, and a voltage applicator that applies a voltage between the anode and the cathode. Upon the voltage applicator applying the voltage, the compression apparatus causes protons extracted from an anode fluid fed to the anode to move to the cathode through the electrolyte membrane and produces compressed hydrogen. The anode separator has a fluid channel through which the anode fluid flows on the anode, a manifold hole through which the anode fluid is fed to the fluid channel, and a communicating path through which the manifold hole and the fluid channel are communicated with each other. The fluid channel, the manifold hole, and the communicating path are formed in an anode-side principal surface of the anode separator, the anode-side principal surface being directed toward the anode. The compression apparatus includes a face seal disposed on an outer periphery of a region of the anode-side principal surface of the anode separator, the region facing the anode, the face seal being arranged to cover the communicating path. The face seal has a three-layer structure including a metal sheet and a pair of elastic sheets disposed on respective principal surfaces of the metal sheet.

The compression apparatus according to the above aspect of the present disclosure may reduce the costs of the apparatus while improving the capability of a face seal to seal an anode fluid, compared with the compression apparatuses known in the related art.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

An approach to reducing the costs of the compression apparatus while improving the capability of a seal to seal a low-pressure hydrogen-containing gas was studied taking an electrochemical hydrogen pump as an example of the compression apparatus and, as a result, the following knowledges were obtained.

Figure 1:
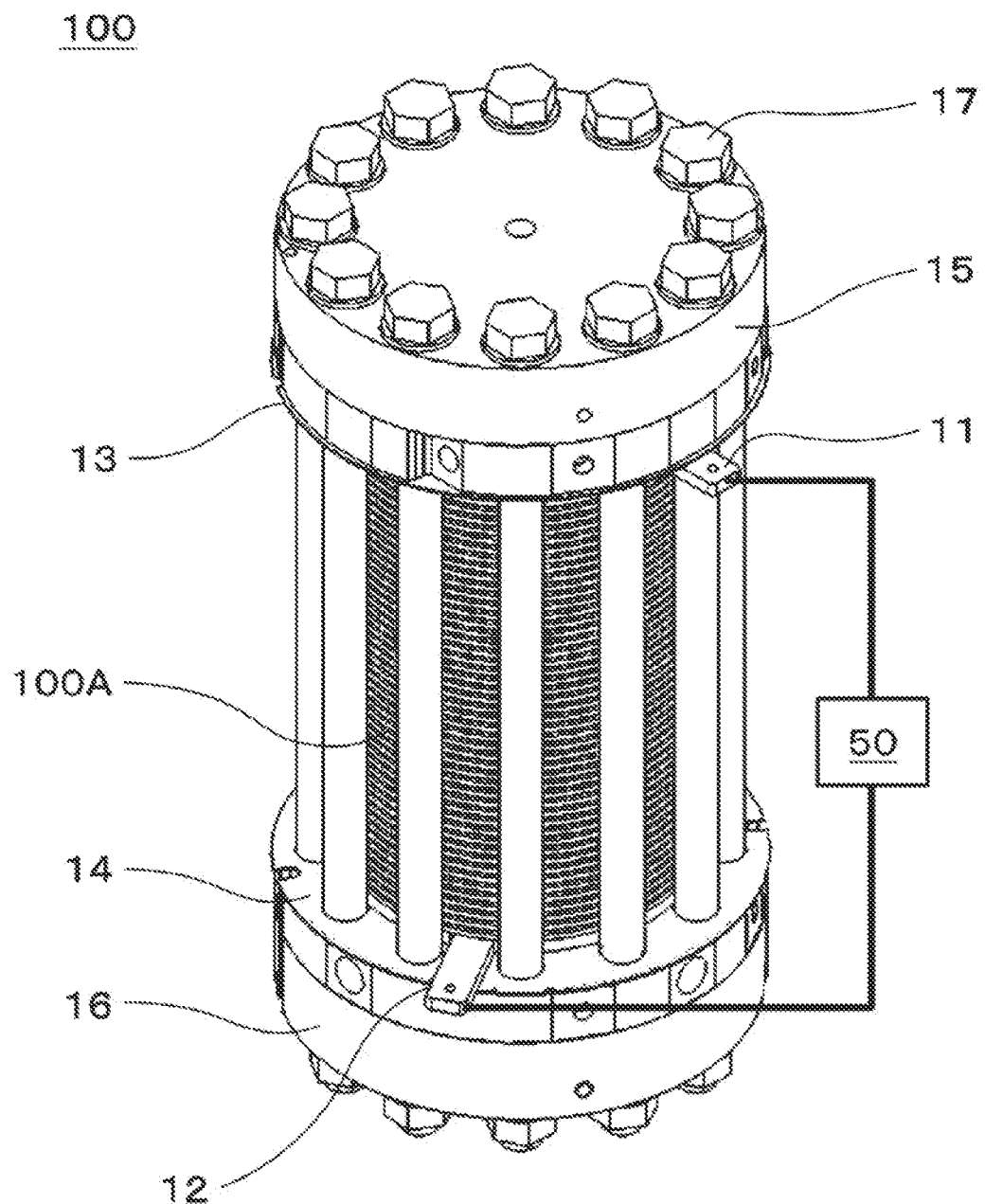
FIG. 1 is a perspective view of an example of an electrochemical hydrogen pump.

FIG. 1 is a perspective view of an example of an electrochemical hydrogen pump.

As illustrated in FIG. 1, an electrochemical hydrogen pump 100 includes a multilayer body 100A (stack) constituted by a plurality of MEAs (cells) stacked on top of one another.

In each of the cells, a pair of separators are each disposed on the outer surface of a corresponding one of the anode and the cathode of the cell. The separator arranged to come into contact with the anode is an electrically conductive plate-like member used for feeding a hydrogen-containing gas to the anode. This plate-like member has a gas channel through which the hydrogen-containing gas, which is fed to the anode, flows. The separator arranged to come into contact with the cathode is an electrically conductive plate-like member used for discharging hydrogen ($H_2$) from the cathode to the outside. This plate-like member has a communicating pathway with which the cathode is connected to the outside. While the gas channel of the anode separator may be formed separately from the separator, it is common to form a groove serving as a gas channel in the surface of the separator in a serpentine manner or the like.

In the outside of each cell, the above separators are disposed in order to mechanically fix the cell in place and electrically connect adjacent cells to each other in series.

The cells and the separators are stacked alternately on top of one another to form a multilayer body including about 10 to 200 cells. The resulting multilayer body 100A (stack) is sandwiched between a pair of end plates 15 and 16 with a pair of power feed plates 11 and 12 and a pair of insulating plates 13 and 14 interposed between the end plates 15 and 16 and the multilayer body 100A. The end plates 15 and 16 are fastened with a plurality of fasteners 17. This is the common multilayer fastening structure.

In the above case, for feeding an adequate amount of hydrogen-containing gas to the serpentine gas channel of each anode separator, it is necessary to divert a groove-like communicating path from an appropriate pipe in the anode separator and connect the downstream end of the communicating path to the end of the gas channel of the anode separator. Such a pipe is referred to as "anode manifold". The anode manifold is constituted by a series of through-holes formed in the respective members constituting the multilayer body 100A at an appropriate position.

Similarly, for discharging high-pressure hydrogen from the cathode of each cathode separator, it is necessary to form the cathode separator such that the above communicating pathway is connected to an appropriate pipe in the cathode separator. Such a pipe is referred to as "cathode manifold". The cathode manifold is constituted by a series of through-holes formed in the respective members constituting the multilayer body 100A at an appropriate position.

The electrochemical hydrogen pump 100 includes appropriate sealing members disposed therein in order to prevent high-pressure hydrogen that flows through the cathode and the cathode manifold and a low-pressure hydrogen-containing gas that flows through the anode and the anode manifold from leaking to the outside. The sealing members are formed in combination with the cells. Typical examples of the sealing members include O-rings disposed on both principal surfaces of each separator. Such O-rings are commonly disposed on both principal surfaces of the anode and cathode separators. This may result in an increase in the costs for the assembly and machining of the electrochemical hydrogen pump 100.

Specifically, since it is necessary to form O-ring grooves in both principal surfaces of each separator, the costs for the machining of the separators are increased compared with the case where the O-ring grooves are formed in only one of the principal surfaces of each separator.

In the case where O-rings are placed in the O-ring grooves formed in both principal surfaces of each separator, attention should be paid to prevent detachment, misalignment, or the like of the O-rings in the assembly of the multilayer body 100A.

For example, for placing O-rings in second O-ring grooves formed in one of the principal surfaces of a separator while O-rings are placed in first O-ring grooves formed in the other principal surface of the separator, the separator needs to be turned upside down. In the above case, for example, the O-rings placed in the first O-ring grooves needs to be temporarily fixed in place in order to prevent the detachment, misalignment, or the like of the O-rings. This increases the number of man-hours required for the assembly of the multilayer body 100A and consequently increases the costs for the assembly of the multilayer body 100A.

It is considered that the same issues as described above may occur in, for example, the water electrolyzer disclosed in Japanese Patent No. 6129809. Specifically, when anode separators, cathode separators, and resin frames constituting the water electrolyzer are stacked on top of one another, sealing members may be interposed between the above members on both principal surfaces of each of the above members in order to prevent the leakage of fluids.

In addition, the gaps between the members disposed in a region of the multilayer body 100A in which the high-pressure hydrogen is present need to be hermetically sealed. Accordingly, it is effective to use O-rings having high sealing reliability for sealing the gaps between such members in an appropriate manner.

With regard to the above, the inventors of the present disclosure determined that it is effective for reducing the assembly and machining costs to interpose a face seal, instead of O-rings, between the members disposed in a region of the multilayer body 100A in which a low-pressure hydrogen-containing gas is present and also found that interposing only a rubber sheet between such members is not sufficient in terms of the capability of the rubber sheet to seal a hydrogen-containing gas. Consequently, the inventors conceived the following aspects of the present disclosure.

Specifically, the anode separator is formed such that the downstream end of a groove-like communicating path diverted from the anode manifold is connected to the end of a gas channel of the anode separator, as described above. Thus, the rubber sheet necessarily covers the communicating path from above. Consequently, for example, the rubber sheet may protrude into the communicating path due to a pressure difference (high pressure) between the cathode and the anode which may occur during the operation of the electrochemical hydrogen pump. The above phenomenon may degrade the capability of the rubber sheet to seal a hydrogen-containing gas. In such a case, the risk of the hydrogen-containing gas leaking to the outside is increased.

Specifically, a compression apparatus according to a first aspect of the present disclosure includes an electrolyte membrane; an anode disposed on a principal surface of the electrolyte membrane; a cathode disposed on another principal surface of the electrolyte membrane; an anode separator disposed on the anode; a cathode separator disposed on the cathode; and a voltage applicator that applies a voltage between the anode and the cathode. Upon the voltage applicator applying the voltage, the compression apparatus causes protons extracted from an anode fluid fed to the anode to move to the cathode through the electrolyte membrane and produces compressed hydrogen. The anode separator has a fluid channel through which the anode fluid flows on the anode, a manifold hole through which the anode fluid is fed to the fluid channel, and a communicating path through which the manifold hole and the fluid channel are communicated with each other, and the fluid channel, the manifold hole, and the communicating path are formed in an anode-side principal surface of the anode separator, the anode-side principal surface being directed toward the anode. The compression apparatus includes a face seal disposed on an outer periphery of a region of the anode-side principal surface of the anode separator, the region facing the anode, the face seal being arranged to cover the communicating path. The face seal has a three-layer structure including a metal sheet and a pair of elastic sheets disposed on respective principal surfaces of the metal sheet.

The above-described compression apparatus according to the above aspect may reduce the costs of the apparatus while improving the capability of the face seal to seal the anode fluid, compared with the compression apparatuses known in the related art.

Specifically, in the compression apparatus according to the above aspect, the face seal is interposed between the members disposed in the region in which a low-pressure anode fluid is present, instead of O-rings. This may reduce the assembly and machining costs compared with the case where O-rings are interposed between such members.

Moreover, the face seal included in the compression apparatus according to the above aspect has a three-layer structure including a metal sheet and a pair of elastic sheets. This increases the stiffness of the face seal compared with the case where, for example, the face seal is constituted by a single elastic sheet. Accordingly, the compression apparatus according to the above aspect reduces the risk of the face seal protruding into the communicating path due to the pressure difference (high pressure) between the cathode and the anode which may occur during the operation of the compression apparatus and consequently reduces the risk of the anode fluid leaking to the outside.

A compression apparatus according to a second aspect of the present disclosure is based on the compression apparatus according to the first aspect, wherein the anode separator and the cathode separator may be merged with each other.

The number of the components of the compression apparatus according to the above aspect is small. This increases the efficiency of the assembly work. Moreover, in the compression apparatus according to the above aspect, the anode separator and the cathode separator are merged with each other by diffusion bonding or the like. This eliminates the gap present at the joint between the anode separator and the cathode separator and consequently reduces the contact resistance therebetween.

A compression apparatus according to a third aspect of the present disclosure is based on the compression apparatus according to the first or second aspect, wherein the metal sheet may be composed of a stainless steel.

Since the metal sheet included in the compression apparatus according to the above aspect is composed of a stainless steel, both high stiffness and high cost efficiency may be readily achieved.

A compression apparatus according to a fourth aspect of the present disclosure is based on the compression apparatus according to the third aspect, wherein the stainless steel may be SUS316 or SUS316L.

Among various types of stainless steels, SUS316 and SUS316L in the Japanese Industrial Standards (JIS) have suitable properties in terms of acid resistance, hydrogen embrittlement resistance, etc. Therefore, it is advantageous to use SUS316 or SUS316L as a material constituting the metal sheet included in the compression apparatus according to the above aspect.

A compression apparatus according to a fifth aspect of the present disclosure is based on the compression apparatus according to the third aspect, wherein the stainless steel may be 4401-316-00-I, 4436-316-00-I, 4404-316-03-I, 4432-316-03-I, or 4436-316-91-I.

Note that SUS316 in Japanese Industrial Standards (JIS) corresponds to 4401-316-00-I and 4436-316-00-I in International Standard (ISO) 15510. SUS316L in JIS corresponds to 4404-316-03-I, 4432-316-03-I, 4436-316-91-I, and 4401-316-00-I in International Standard ISO 15510.

A compression apparatus according to a sixth aspect of the present disclosure is based on the compression apparatus according to the third aspect, wherein the stainless steel may be 1.4401, 1.4436, 1.4404, 1.4432, or 1.4435.

Note that SUS316 in Japanese Industrial Standards (JIS) corresponds to 1.4401 and 1.4436 in European Standards (EN). SUS316L in JIS corresponds to 1.4404, 1.4432, and 1.4435 in EN.

A compression apparatus according to a seventh aspect of the present disclosure is based on the compression apparatus according to the third aspect, wherein the metal substrate sheet may be composed of S31600 or S31603.

Note that SUS316 in Japanese Industrial Standards (JIS) corresponds to S31600 in the Unified Numbering Systems (UNS). SUS316L in JIS corresponds to S31603 in UNS.

A compression apparatus according to an eighth aspect of the present disclosure is based on the compression apparatus according to the third aspect, wherein the metal substrate sheet may be composed of S31608 or S31603.

Note that SUS316 in Japanese Industrial Standards (JIS) corresponds to S31608 in the China National Standards (GB). SUS316L in JIS corresponds to S31603 in GB.

A compression apparatus according to a ninth aspect of the present disclosure is based on the compression apparatus according to any one of the first to eighth aspects, wherein the metal sheet may have a thickness of greater than or equal to 0.3 mm.

The compression apparatus according to the above aspect may improve the stiffness of the face seal compared with the case where the thickness of the metal sheet is less than 0.3 mm.

A compression apparatus according to a tenth aspect of the present disclosure is based on the compression apparatus according to any one of the first to ninth aspects, wherein the elastic sheets may be composed of a fluorine rubber.

Among various types of rubbers, a fluorine rubber has suitable properties in terms of chemical stability, such as acid resistance. Therefore, it is advantageous to use a fluorine rubber as a material constituting the elastic sheets included in the compression apparatus according to the above aspect.

Embodiments of the present disclosure are described with reference to the attached drawings below. The following embodiments are merely illustrative of examples of the foregoing aspects. Therefore, the shapes, materials, components, the arrangement of the components, the connections between the components, etc. are merely examples and do not limit the above-described aspects unless otherwise specified in the claims. Among the components described below, components that are not described in the independent claims, which indicate the highest concepts of the above-described aspects, are described as optional components. The description of components denoted by the same reference numeral in the drawings may be omitted. In the drawings, components are illustrated schematically for ease of comprehension; the shapes of the components, the dimensional ratio between the components, etc. are not always accurate.

First Embodiment

Various types of gases and liquids may be used as an anode fluid of the above-described compression apparatus.

For example, in the case where the compression apparatus is an electrochemical hydrogen pump, examples of the anode fluid include a hydrogen-containing gas. For example, in the case where the compression apparatus is a water electrolyzer, examples of the anode fluid include liquid water.

In the following embodiment, the structure of an electrochemical hydrogen pump, which is an example of the compression apparatus in which the anode fluid is a hydrogen-containing gas, and the operation of the electrochemical hydrogen pump are described.

Apparatus Structure

Figure 2:
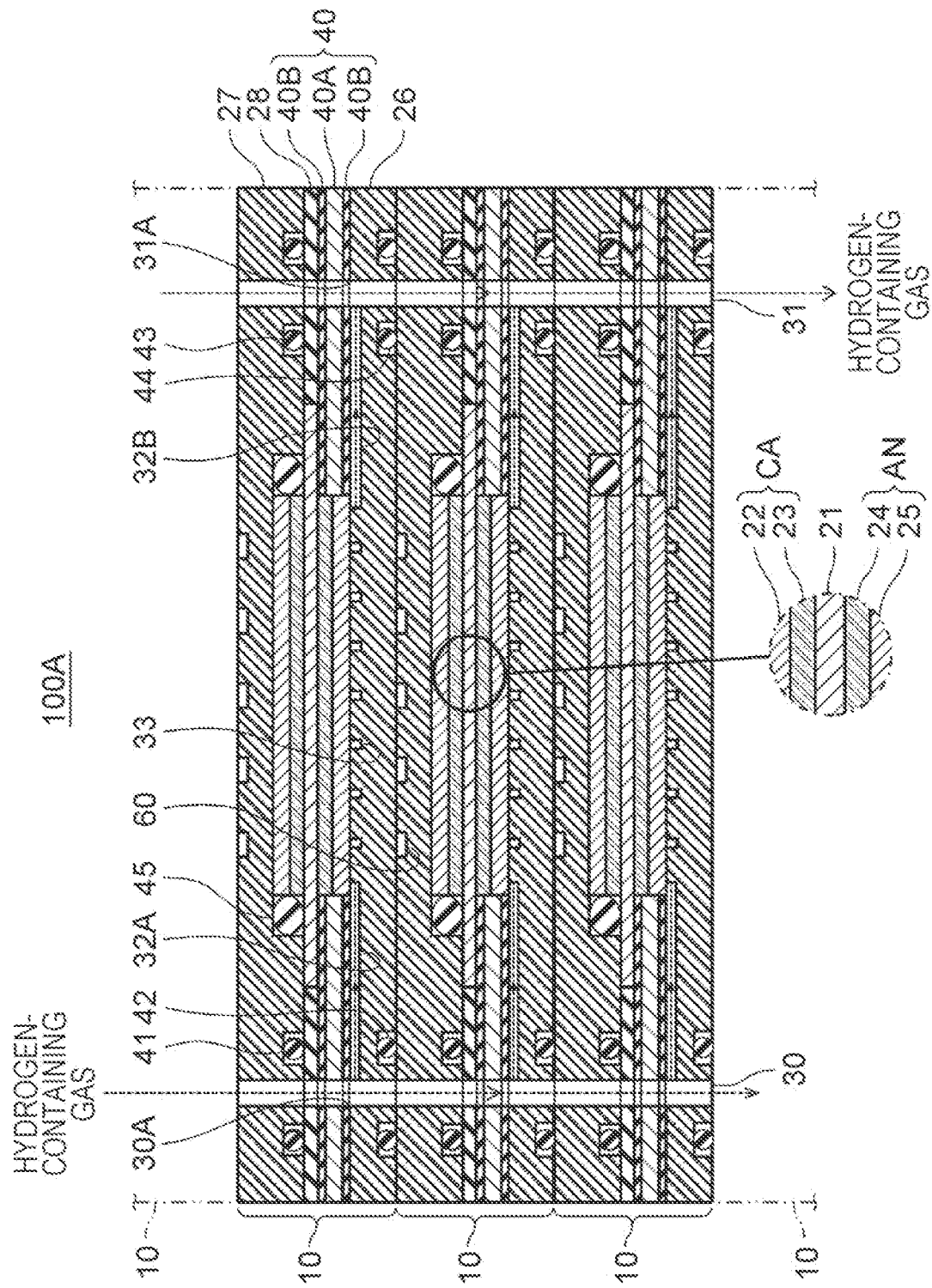
FIG. 2 is a diagram illustrating an example of a hydrogen pump unit included in an electrochemical hydrogen pump according to a first embodiment.

FIG. 2 is a diagram illustrating an example of the hydrogen pump unit included in the electrochemical hydrogen pump according to the first embodiment. FIG. 2 illustrates a vertical cross section of the multilayer body 100A which includes a straight line that passes through the center of the multilayer body 100A and the centers of an anode gas entry manifold 30 and an anode gas delivery manifold 31 in a plan view of the electrochemical hydrogen pump 100 illustrated in FIG. 1 (the same applies to FIG. 3).

A vertical cross section of the multilayer body 100A which includes a straight line that passes through the center of the multilayer body 100A and the centers of cathode gas delivery manifolds (not illustrated in the drawing) is not illustrated or described, because it can be readily understood with reference to FIG. 2.

In the example illustrated in FIG. 2, the electrochemical hydrogen pump 100 includes at least one hydrogen pump unit 10.

The electrochemical hydrogen pump 100 includes a plurality of hydrogen pump units 10 stacked on top of one another. Although, for example, three hydrogen pump units 10 are stacked on top of one another in FIG. 2, the number of the hydrogen pump units 10 is not limited to this. That is, the number of the hydrogen pump units 10 may be set appropriately in accordance with the operating conditions, such as the amount of hydrogen compressed by the electrochemical hydrogen pump 100.

The hydrogen pump unit 10 includes an electrolyte membrane 21, an anode AN, a cathode CA, a cathode separator 27, an anode separator 26, an insulator 28, and a face seal 40. In the hydrogen pump unit 10, the electrolyte membrane 21, an anode catalyst layer 24, a cathode catalyst layer 23, an anode power feeder 25, a cathode power feeder 22, the anode separator 26, and the cathode separator 27 are stacked on top of one another.

The anode AN is disposed on one of the principal surfaces of the electrolyte membrane 21. The anode AN is an electrode including the anode catalyst layer 24 and the anode power feeder 25. A ring-like face seal 40 is arranged to surround the anode AN when viewed in plan. This enables the anode AN to be sealed with the face seal 40 in an appropriate manner. Details of the structure of the face seal 40 are described below.

The cathode CA is disposed on the other principal surface of the electrolyte membrane 21. The cathode CA is an electrode including the cathode catalyst layer 23 and the cathode power feeder 22. An O-ring 45 is placed in a recess formed in the cathode CA-side principal surface of the cathode separator 27 so as to surround the cathode CA when viewed in plan. This enables the cathode CA to be sealed with the O-ring 45 in an appropriate manner.

Thus, the electrolyte membrane 21 is sandwiched between the anode AN and the cathode CA so as to come into contact with the anode catalyst layer 24 and the cathode catalyst layer 23.

The electrolyte membrane 21 is a proton-conducting polymer membrane. The electrolyte membrane 21 may be any polymer membrane having protonic conductivity. Examples of the electrolyte membrane 21 include, but are not limited to, a fluorine-based polymer electrolyte membrane and a hydrocarbon polymer electrolyte membrane. Specific examples of the electrolyte membrane 21 include Nafion (registered trademark, produced by Du Pont) and Aciplex (registered trademark, produced by Asahi Kasei Corporation).

The anode catalyst layer 24 is arranged to abut against one of the principal surfaces of the electrolyte membrane 21. Examples of a catalyst metal included in the anode catalyst layer 24 include, but are not limited to, platinum.

The cathode catalyst layer 23 is arranged to abut against the other principal surface of the electrolyte membrane 21. Examples of a catalyst metal included in the cathode catalyst layer 23 include, but are not limited to, platinum.

Examples of a catalyst carrier for the cathode catalyst layer 23 and the anode catalyst layer 24 include, but are not limited to, carbon particles, such as carbon black particles and graphite particles; and electrically conductive oxide particles.

In the cathode catalyst layer 23 and the anode catalyst layer 24, highly-dispersed microparticles of the catalyst metal are supported on the catalyst carrier. In addition, a proton-conducting ionomer component is commonly added to the cathode catalyst layer 23 and the anode catalyst layer 24 in order to increase the electrode reaction field.

The cathode power feeder 22 is disposed on the cathode catalyst layer 23. The cathode power feeder 22 is composed of a porous material and has electrical conductivity and gas diffusibility. The cathode power feeder 22 desirably has a certain degree of elasticity that enables the cathode power feeder 22 to appropriately follow the displacement and deformation of the components which may occur during the operation of the electrochemical hydrogen pump 100 due to the pressure difference between the cathode CA and the anode AN. In the electrochemical hydrogen pump 100 according to this embodiment, a member composed of carbon fibers is used as a cathode power feeder 22. Porous carbon fiber sheets, such as a carbon paper sheet, a carbon cloth, and a carbon felt sheet, may also be used. A carbon fiber sheet is not necessarily used as a substrate for the cathode power feeder 22; other examples of the substrate for the cathode power feeder 22 include a sintered body of metal fibers produced using titanium, a titanium alloy, or stainless steel as a raw material; and a sintered body of metal particles produced using any of the above raw materials.

The anode power feeder 25 is disposed on the anode catalyst layer 24. The anode power feeder 25 is composed of a porous material and has electrical conductivity and gas diffusibility. The anode power feeder 25 desirably has a high stiffness that reduces the displacement and deformation of the components which may occur during the operation of the electrochemical hydrogen pump 100 due to the pressure difference between the cathode CA and the anode AN.

Specific examples of a substrate for the anode power feeder 25 include a sintered body of a fiber or powder produced using titanium, a titanium alloy, stainless steel, carbon, or the like as a raw material, an expanded metal, a metal mesh, and a perforated metal.

The anode separator 26 is a member disposed on the anode AN. The cathode separator 27 is a member disposed on the cathode CA. Specifically, the anode power feeder 25 is arranged to come into contact with a region (the center) of the anode AN-side surface of the anode separator 26, the region facing the anode AN. A recess is formed at the center of the cathode separator 27. The cathode power feeder 22 is accommodated in the recess.

The anode separator 26 and the cathode separator 27 may be composed of a metal sheet made of titanium, a stainless steel, or the like. In the case where the metal sheet is made of a stainless steel, among various types of stainless steels, SUS316 and SUS316L are excellent in terms of acid resistance, hydrogen embrittlement resistance, etc.

The above-described MEA is sandwiched between the cathode separator 27 and the anode separator 26 in the above-described manner to form the hydrogen pump unit 10.

A ring-like and flat plate-like insulator 28 may be interposed between the cathode separator 27 and the face seal 40 so as to surround the electrolyte membrane 21. Examples of the material constituting the insulator 28 include, but are not limited to, a fluorine rubber. This may eliminate the risk of short circuit between the cathode separator 27 and the anode separator 26 in the hydrogen pump unit 10 in an appropriate manner.

As illustrated in FIG. 1, the electrochemical hydrogen pump 100 includes a pair of end plates 15 and 16 disposed on the respective ends in the direction in which the hydrogen pump units 10 are stacked on top of one another and fasteners 17 that fasten the end plates 15 and 16 in the above stacking direction.

The fasteners 17 may be any fasteners capable of fastening a plurality of the hydrogen pump units 10 and the pair of end plates 15 and 16 in the above stacking direction.

Examples of the fasteners 17 include bolts and nuts with conical spring washer.

Thus, in the electrochemical hydrogen pump 100 according to this embodiment, a plurality of the hydrogen pump units 10 are appropriately held by the fastening pressure of the fasteners 17 in the above stacking direction, while stacked on top of one another. This enhances the sealing capability of the sealing members (the O-rings and the face seal 40) interposed between the members constituting the hydrogen pump units 10 to an adequate degree and reduces the contact resistance between the members.

The end plate 15 illustrated in FIG. 1 has an anode gas entry pathway (not illustrated in the drawing) formed therein at an appropriate position. The anode gas entry pathway may be constituted by, for example, a piping through which the hydrogen-containing gas, which is fed to the anode AN, flows.

The anode gas entry pathway is communicated with a cylindrical anode gas entry manifold 30 (FIG. 2). The anode gas entry manifold 30 is constituted by a series of through-holes formed in the members constituting the hydrogen pump units 10.

In the electrochemical hydrogen pump 100 according to this embodiment, each of the hydrogen pump units 10 has an anode gas channel 33 through which the hydrogen-containing gas flows on the anode AN, an anode gas entry manifold hole 30A through which the hydrogen-containing gas is fed to the anode gas channel 33, and a first communicating path 32A through which the anode gas entry manifold hole 30A and the anode gas channel 33 are communicated with each other. The anode gas channel 33, the anode gas entry manifold hole 30A, and the first communicating path 32A are formed in the anode AN-side principal surface of the anode separator 26.

The anode gas entry manifold hole 30A corresponds to an opening that is formed in the anode AN-side principal surface of the anode separator 26 and serves as a part of the anode gas entry manifold 30.

The anode gas channel 33 may be a serpentine channel groove that includes, for example, a plurality of U-shaped turnaround portions and a plurality of straight portions when viewed in plan. In this embodiment, the straight portions of the anode gas channel 33 extend in a direction perpendicular to the cross section illustrated in FIG. 2.

Note that the above-described anode gas channel 33 is merely illustrative; the anode gas channel is not limited to the above example. For example, the anode gas channel may be constituted by a plurality of straight channel grooves.

The first communicating path 32A is a channel groove formed in the anode AN-side principal surface of the anode separator 26. This channel groove is arranged to extend from one of the ends of the anode gas channel 33 to the anode gas entry manifold hole 30A.

Thus, the anode gas entry manifold 30 is communicated with an end of the anode gas channel 33 included in each of the hydrogen pump units 10 through the first communicating path 32A. This enables a hydrogen-containing gas fed from the anode gas entry pathway to the anode gas entry manifold 30 to be distributed to each of the hydrogen pump units 10 through the first communicating path 32A of the hydrogen pump unit 10 as denoted by the dotted line in FIG. 2. While the distributed hydrogen-containing gas passes through the anode gas channel 33, the hydrogen-containing gas is fed from the anode power feeder 25 to the anode catalyst layer 24.

The end plate 16 illustrated in FIG. 1 has an anode gas delivery pathway (not illustrated in the drawing) formed therein at an appropriate position. The anode gas delivery pathway may be constituted by, for example, a piping through which the hydrogen-containing gas, which is discharged from the anode AN, flows.

The anode gas delivery pathway is communicated with a cylindrical anode gas delivery manifold 31 (FIG. 2). The anode gas delivery manifold 31 is constituted by a series of through-holes formed in the members constituting the hydrogen pump units 10.

In the electrochemical hydrogen pump 100 according to this embodiment, each of the hydrogen pump units 10 has an anode gas delivery manifold hole 31A and a second communicating path 32B through which the anode gas delivery manifold hole 31A and the anode gas channel 33 are communicated with each other. The anode gas delivery manifold hole 31A and the second communicating path 32B are formed in the anode AN-side principal surface of the anode separator 26.

The anode gas delivery manifold hole 31A corresponds to an opening that is formed in the anode AN-side principal surface of the anode separator 26 and serves as a part of the anode gas delivery manifold 31.

The second communicating path 32B is a channel groove formed in the anode AN-side principal surface of the anode separator 26. This channel groove is arranged to extend from the other end of the anode gas channel 33 to the anode gas delivery manifold hole 31A.

Thus, the anode gas delivery manifold 31 is communicated with the other end of the anode gas channel 33 included in each of the hydrogen pump units 10 through the second communicating path 32B. This enables the hydrogen-containing gas that has passed through the anode gas channel 33 of each of the hydrogen pump units 10 to be fed to the anode gas delivery manifold 31 through the second communicating path 32B as denoted by the dotted line in FIG. 2. The hydrogen-containing gases merge with one another in the anode gas delivery manifold 31. The merged hydrogen-containing gas is delivered to the anode gas delivery pathway.

Although not illustrated in the drawings, the cathode separator 27 has a communicating pathway formed therein at an appropriate position, through which the inside of the recess of the cathode separator 27 and the inside of the cathode manifold are communicated with each other. This enables the high-pressure hydrogen gas present on the cathode CA to be discharged to the outside of the electrochemical hydrogen pump 100 through the communicating pathway and the cathode manifold, which are not illustrated in the drawings, during the operation of the electrochemical hydrogen pump 100.

In the electrochemical hydrogen pump 100 according to this embodiment, O-rings 41 and 42 are disposed in a region of the cathode separator 27 which is in contact with the insulator 28 and a region of the anode separator 26 which is in contact with the cathode separator 27, respectively, so as to surround the anode gas entry manifold 30 when viewed in plan. The O-ring 41 is placed in an O-ring groove formed in the insulator 28-side principal surface of the cathode separator 27. The O-ring 42 is placed in an O-ring groove formed in the cathode separator 27-side principal surface of the anode separator 26.

This enables the gaps between the above members constituting the anode gas entry manifold 30 to be sealed with the O-rings 41 and 42 in an appropriate manner.

Furthermore, O-rings 43 and 44 are disposed in a region of the cathode separator 27 which is in contact with the insulator 28 and a region of the anode separator 26 which is in contact with the cathode separator 27, respectively, so as to surround the anode gas delivery manifold 31 when viewed in plan. The O-ring 43 is placed in an O-ring groove formed in the insulator 28-side principal surface of the cathode separator 27. The O-ring 44 is placed in an O-ring groove formed in the cathode separator 27-side principal surface of the anode separator 26.

This enables the gaps between the above members constituting the anode gas delivery manifold 31 to be sealed with the O-rings 43 and 44 in an appropriate manner.

Moreover, a heating medium channel 60 is formed in a region of the cathode separator 27 which is in contact with the anode separator 26 when viewed in plan. Although the heating medium channel 60 is constituted by a channel groove formed in the anode separator 26-side principal surface of the cathode separator 27 in this embodiment, the heating medium channel is not limited to this; the heating medium channel 60 may be formed in the principal surface of the anode separator 26.

This enables the temperature of the hydrogen pump unit 10 to be controlled in an appropriate manner by adjusting the temperature, flow rate, etc. of a heating medium that flows through the heating medium channel 60 during the operation of the electrochemical hydrogen pump 100. Examples of the heating medium include, but are not limited to, liquid water and antifreeze.

In the electrochemical hydrogen pump 100 according to this embodiment, as illustrated in FIG. 2, the face seal 40 is disposed on an outer periphery of a region of the anode AN-side principal surface of the anode separator 26, the region facing the anode AN, so as to cover the first communicating path 32A and the second communicating path 32B. The face seal 40 has a plurality of through-holes formed therein at appropriate positions. These through-holes serve as a part of the anode gas entry manifold 30 and the anode gas delivery manifold 31.

The face seal 40 has a three-layer structure constituted by a metal sheet 40A and a pair of elastic sheets 40B disposed on the respective principal surfaces of the metal sheet 40A. This enables the face seal 40 to have certain stiffness and certain sealing capability.

Specifically, the metal sheet 40A included in the face seal 40 imparts certain stiffness to the face seal 40 in an appropriate manner. Examples of the material constituting the metal sheet 40A include, but are not limited to, a stainless steel, titanium, a titanium alloy, an aluminum alloy, and a magnesium alloy.

In addition, the elastic sheets 40B included in the face seal 40 impart a capability to seal the hydrogen-containing gas to the face seal 40 in an appropriate manner. Furthermore, when the elastic sheets 40B are composed of an insulating material, the degree of insulation between the cathode separator 27 and the anode separator 26 in the hydrogen pump unit 10 can be increased. Examples of the material constituting the elastic sheets 40B include, but are not limited to, rubbers, such as a fluorine rubber, a silicon rubber, an ethylene-propylene rubber, and a butadiene rubber.

As illustrated in FIG. 1, the electrochemical hydrogen pump 100 includes a voltage applicator 50.

The voltage applicator 50 is a device that applies a voltage between the anode AN and the cathode CA. Specifically, a high potential of the voltage applicator 50 is applied to the anode AN, while a low potential of the voltage applicator 50 is applied to the cathode CA. The voltage applicator 50 may be any device capable of applying a voltage between the anode AN and the cathode CA. For example, the voltage applicator 50 may be a device that controls the voltage applied between the anode AN and the cathode CA. When the voltage applicator 50 is connected to a direct-current power source, such as a battery, a solar cell, or a fuel cell, the voltage applicator 50 includes a DC-to-DC converter. When the voltage applicator 50 is connected to an alternating-current power source, such as a commercial power source, the voltage applicator 50 includes an AC-to-DC converter.

The voltage applicator 50 may be, for example, a power-type power source, which controls the voltage applied between the anode AN and the cathode CA and the current that flows between the anode AN and the cathode CA such that the power fed to the hydrogen pump units 10 is maintained to be a predetermined value.

In the example illustrated in FIG. 1, a low-potential-side terminal of the voltage applicator 50 is connected to the power feed plate 11, while a high-potential-side terminal of the voltage applicator 50 is connected to the power feed plate 12. The power feed plate 11 is arranged to come into electrical contact with the cathode separator 27 located at one of the ends of the multilayer body in the above stacking direction. The power feed plate 12 is arranged to come into electrical contact with the anode separator 26 located at the other end of the multilayer body in the stacking direction.

In the above-described manner, upon the voltage applicator 50 applying the above voltage, the electrochemical hydrogen pump 100 causes protons extracted from the hydrogen-containing gas fed to the anode AN to move to the cathode CA through the electrolyte membrane 21 and produces compressed hydrogen.

Although not illustrated in the drawings, a hydrogen feed system including the above-described electrochemical hydrogen pump 100 may be produced. In such a case, devices required in the hydrogen feed action of the hydrogen feed system may be optionally formed as needed.

For example, the hydrogen feed system may include a dew point regulator (e.g., a humidifier) that controls the dew point of a mixed gas of the high-humidity hydrogen-containing gas discharged from the anode AN and the low-humidity hydrogen-containing gas fed from an external hydrogen feed source. The hydrogen-containing gas fed from an external hydrogen feed source may be produced using a water electrolyzer or the like.

The hydrogen feed system may also include, for example, a temperature sensor that detects the temperature of the electrochemical hydrogen pump 100, a hydrogen storage that temporarily stores the hydrogen discharged from the cathode CA of the electrochemical hydrogen pump 100, and a pressure sensor that detects the pressure of the hydrogen gas stored in the hydrogen storage.

Note that the above-described structure of the electrochemical hydrogen pump 100 and the above-described various devices included in the hydrogen feed system, which are not illustrated in the drawings, are merely illustrative; the structure of the electrochemical hydrogen pump 100 and devices included in the hydrogen feed system are not limited to the above-described examples.

For example, a structure in which the anode gas delivery manifold 31 is omitted and the whole amount of hydrogen included in the hydrogen-containing gas fed to the anodes AN through the anode gas entry manifold 30 is compressed in the cathodes CA, that is, a "dead-end" structure, may be employed.

Action

An example of the hydrogen compression action of the electrochemical hydrogen pump 100 is described below with reference to the attached drawings.

The action described below may be performed by, for example, a computing circuit of a controller, which is not illustrated in the drawings, reading a control program from a memory circuit of the controller. Note that the action described below is not necessarily performed by a controller; part of the action may be performed by the operator.

First, a low-pressure hydrogen-containing gas is fed to the anode AN of the electrochemical hydrogen pump 100 and a voltage applied by the voltage applicator 50 is fed to the electrochemical hydrogen pump 100.

Upon the application of the voltage, hydrogen molecules are split into protons and electrons in the anode catalyst layer 24 of the anode AN as a result of an oxidation reaction (Formula (1)). The protons transfers through the electrolyte membrane 21 and move to the cathode catalyst layer 23, while the electrons move to the cathode catalyst layer 23 through the voltage applicator 50.

In the cathode catalyst layer 23, hydrogen molecules are reproduced as a result of a reduction reaction (Formula (2)). It is known that, when the protons transfer through the electrolyte membrane 21, a predetermined amount of water also moves from the anode AN to the cathode CA as electro-osmosis water, accompanying with the protons.

The hydrogen ($H_2$) produced in the cathode CA can be compressed by increasing the pressure loss of the hydrogen delivery pathways using a flow rate regulator, which is not illustrated in the drawings. Examples of the flow rate regulator include a back pressure valve and a control valve disposed in the hydrogen delivery pathways.

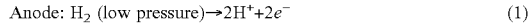
$$\text{Anode: } H_2 \text{ (low pressure)} \rightarrow 2H^+ + 2e^- \qquad (1)$$

$$\text{Cathode: } 2H^+ + 2e^- \rightarrow H_2 \text{ (high pressure)} \qquad (2)$$

As described above, in the electrochemical hydrogen pump 100, upon the voltage applicator 50 applying a voltage, the hydrogen included in the hydrogen-containing gas fed to the anode AN is compressed in the cathode CA. The hydrogen compression action of the electrochemical hydrogen pump 100 is performed in the above-described manner. The hydrogen compressed in the cathode CA is temporarily stored in, for example, a hydrogen storage, which is not illustrated in the drawings. The hydrogen stored in the hydrogen storage is fed to a body that requires hydrogen at any time as needed. Examples of the body that requires hydrogen include a fuel cell, which generates power by using hydrogen.

As described above, the electrochemical hydrogen pump 100 according to this embodiment may reduce the costs of the apparatus while improving the capability of the face seal 40 to seal the hydrogen-containing gas, compared with the compression apparatuses known in the related art.

Specifically, in the electrochemical hydrogen pump 100 according to this embodiment, the face seal 40 is interposed between the members disposed in a region in which a low-pressure hydrogen-containing gas is present, instead of O-rings. This may reduce the assembly and machining costs compared with the case where O-rings are interposed between such members.

Furthermore, since the face seal 40 included in the electrochemical hydrogen pump 100 according to this embodiment has a three-layer structure constituted by the metal sheet 40A and a pair of the elastic sheets 40B, the stiffness of the face seal 40 can be enhanced compared with the case where, for example, the face seal 40 is constituted by a single elastic sheet (e.g., a rubber sheet). This enables the electrochemical hydrogen pump 100 according to this embodiment to reduce the risk of the face seal 40 protruding into the first communicating path 32A and the second communicating path 32B due to the pressure difference (high pressure) between the cathode CA and the anode AN which may occur during the operation of the electrochemical hydrogen pump 100 and consequently reduces the risk of the hydrogen-containing gas leaking to the outside.

Example

An electrochemical hydrogen pump 100 according to this example is the same as the electrochemical hydrogen pump 100 according to the first embodiment, except the structure of the face seal 40 described below.

The metal sheet 40A included in the face seal 40 is desirably composed of a stainless steel. In such a case, the electrochemical hydrogen pump 100 according to this example may readily achieve both suitable stiffness and suitable cost efficiency.

The above stainless steel is desirably SUS316 or SUS316L. Among various types of stainless steels, SUS316 and SUS316L have suitable properties in terms of acid resistance, hydrogen embrittlement resistance, etc. Therefore, it is advantageous to use SUS316 or SUS316L as a material constituting the metal sheet 40A included in the electrochemical hydrogen pump 100 according to this example.

The metal sheet 40A included in the face seal 40 desirably has a thickness of greater than or equal to 0.3 mm. In such a case, the electrochemical hydrogen pump 100 according to this example may improve the stiffness of the face seal 40 compared with the case where the thickness of the metal sheet 40A is less than 0.3 mm.

The elastic sheets 40B included in the face seal 40 are desirably composed of a fluorine rubber. Among various types of rubbers, a fluorine rubber has suitable properties in terms of chemical stability, such as acid resistance. Therefore, it is advantageous to use a fluorine rubber as a material constituting the elastic sheets 40B included in the electrochemical hydrogen pump 100 according to this example.

The electrochemical hydrogen pump 100 according to this example may be the same as the electrochemical hydrogen pump 100 according to the first embodiment, except the above-described features.

Second Embodiment

Figure 3:
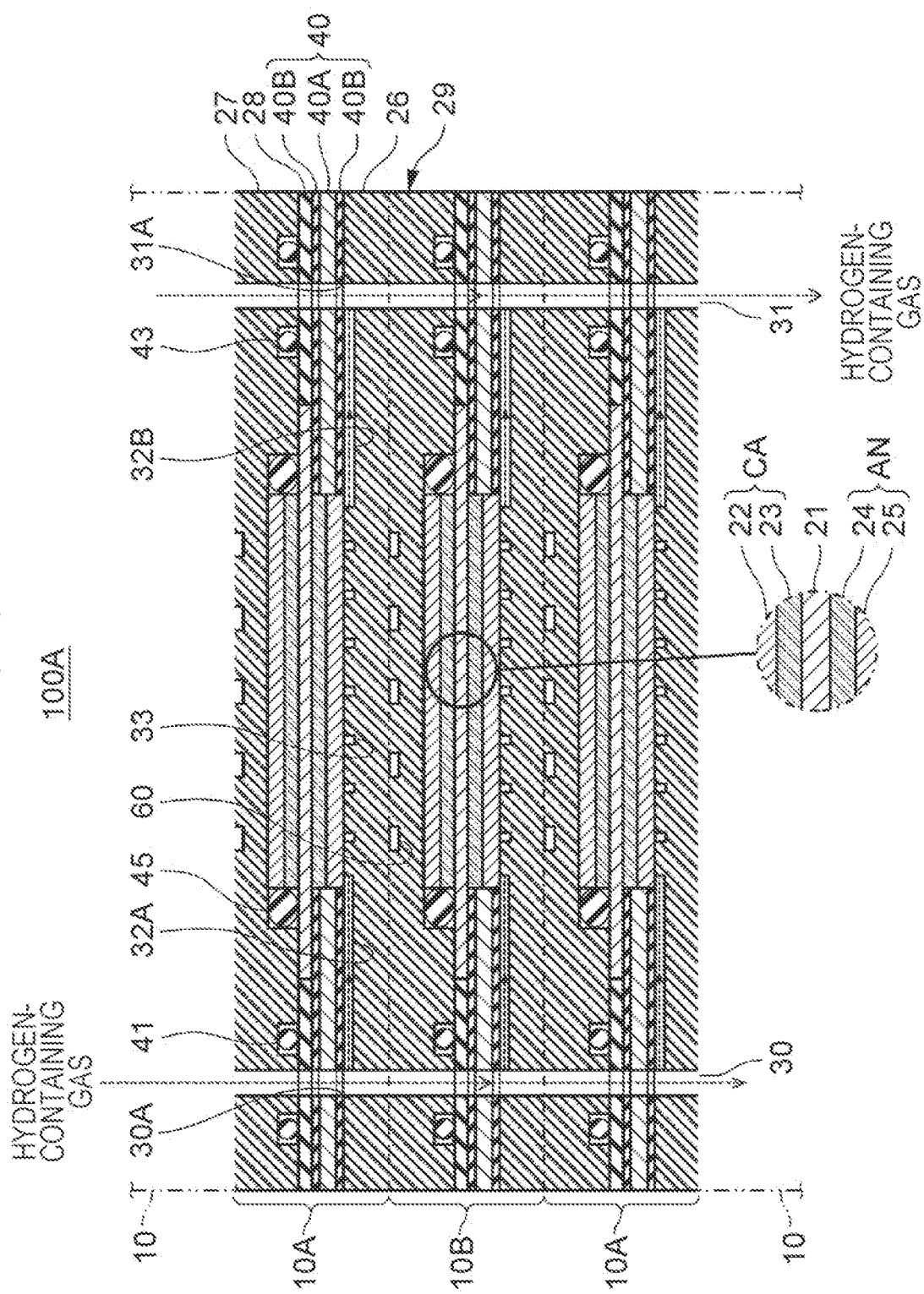
FIG. 3 is a diagram illustrating an example of a hydrogen pump unit included in an electrochemical hydrogen pump according to a second embodiment.

FIG. 3 is a diagram illustrating an example of a hydrogen pump unit included in an electrochemical hydrogen pump according to a second embodiment.

As illustrated in FIG. 3, the anode separator 26 and the cathode separator 27 included in each of the hydrogen pump units 10 of the electrochemical hydrogen pump 100 according to this embodiment are merged with each other. This reduces the number of components of the electrochemical hydrogen pump 100. For example, the number of the separators can be reduced. Furthermore, sealing members (e.g., the O-rings 42 and 44 in FIG. 2) that are to be interposed between the separators can be omitted.

Specifically, a bipolar plate 29 serves as both anode separator 26 of a hydrogen pump unit 10A and cathode separator 27 of a hydrogen pump unit 10B.

The method for joining the anode separator 26 and the cathode separator 27 to each other is not limited. For example, the anode separator 26 and the cathode separator 27 can be joined to each other by various methods, such as diffusion bonding, mechanical joint, such as bolt fastening, bonding, and welding. The bipolar plate 29 may be formed by 3D printing or the like.

Note that a channel groove constituting the heating medium channel 60 is formed in the principal surface of the cathode separator 27 before the anode separator 26 and the cathode separator 27 are joined to each other. Although not illustrated in the drawing, this channel groove may be formed in the principal surface of the anode separator 26.

As described above, reducing the number of the components of the electrochemical hydrogen pump 100 according to this embodiment increases the efficiency of the assembly work. Moreover, in the electrochemical hydrogen pump 100 according to this embodiment, the anode separator 26 and the cathode separator 27 are merged with each other by diffusion bonding or the like. This eliminates the gap present at the joint between the anode separator 26 and the cathode separator 27 and consequently reduces the contact resistance therebetween.

The electrochemical hydrogen pump 100 according to this embodiment may be the same as the electrochemical hydrogen pump 100 according to the first embodiment or the example of the first embodiment, except the above-described features.

The first embodiment, the example of the first embodiment, and the second embodiment may be combined with one another as long as the combined embodiments do not contradict with each other.

From the foregoing description, various modifications and other embodiments of the present disclosure are obvious to one skilled in the art. Therefore, the foregoing description should be interpreted only as an example and is provided for the purpose of teaching the best mode for carrying out the present disclosure to one skilled in the art. The structural and/or functional details may be substantially altered without departing from the spirit of the present disclosure.

For example, the face seal 40 included in the electrochemical hydrogen pump 100 may be applied to other compression apparatuses, such as a water electrolyzer.

An aspect of the present disclosure may be applied to a compression apparatus that may reduce the costs of the apparatus while improving the capability of a face seal to seal an anode fluid, compared with the compression apparatuses known in the related art.

What is claimed is:

1. A compression apparatus comprising:
    an electrolyte membrane;
    an anode disposed on a principal surface of the electrolyte membrane;
    a cathode disposed on another principal surface of the electrolyte membrane;
    an anode separator disposed on the anode;
    a cathode separator disposed on the cathode; and
    a voltage applicator that applies a voltage between the anode and the cathode,
    wherein, upon the voltage applicator applying the voltage, the compression apparatus causes protons extracted from an anode fluid fed to the anode to move to the cathode through the electrolyte membrane and produces compressed hydrogen,
    wherein the anode separator has a fluid channel through which the anode fluid flows on the anode, a manifold hole through which the anode fluid is fed to the fluid channel, and a communicating path through which the manifold hole and the fluid channel are communicated with each other, the fluid channel, the manifold hole, and the communicating path being formed in an anode-side principal surface of the anode separator, the anode-side principal surface being directed toward the anode,
    wherein the compression apparatus comprises a face seal disposed on an outer periphery of a region of the anode-side principal surface of the anode separator, the region facing the anode, the face seal being arranged to cover the communicating path, and
    wherein the face seal has a three-layer structure including a metal sheet and a pair of elastic sheets disposed on respective principal surfaces of the metal sheet.

2. The compression apparatus according to claim 1, wherein the anode separator and the cathode separator are merged with each other.

3. The compression apparatus according to claim 1, wherein the metal sheet is composed of a stainless steel.

4. The compression apparatus according to claim 3, wherein the stainless steel is SUS316 or SUS316L.

5. The compression apparatus according to claim 3, wherein the stainless steel is 4401-316-00-I, 4436-316-00-I, 4404-316-03-I, 4432-316-03-I, or 4436-316-91-I.

6. The compression apparatus according to claim 3, wherein the stainless steel is 1.4401, 1.4436, 1.4404, 1.4432, or 1.4435.

7. The compression apparatus according to claim 3, wherein the stainless steel is S31600 or S31603.

8. The compression apparatus according to claim 3, wherein the stainless steel is S31608 or S31603.

9. The compression apparatus according to claim 1, wherein the metal sheet has a thickness of greater than or equal to 0.3 mm.

10. The compression apparatus according to claim 1, wherein the elastic sheets are composed of a fluorine rubber.

* * * * *